(12) United States Patent
Wada et al.

(10) Patent No.: US 9,025,721 B2
(45) Date of Patent: May 5, 2015

(54) HOLDING DEVICE

(75) Inventors: Kunihiko Wada, Yokohama (JP); Fumiyo Kuno, Yokohama (JP); Yutaka Ishiwata, Zushi (JP); Tsuneji Kameda, Tokyo (JP); Ryoichi Hamazaki, Yokohama (JP); Noriyuki Katagiri, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/618,641

(22) Filed: Sep. 14, 2012

(65) Prior Publication Data

US 2013/0070886 A1 Mar. 21, 2013

Related U.S. Application Data

(63) Continuation of application No. PCT/JP2011/001470, filed on Mar. 14, 2011.

(30) Foreign Application Priority Data

Mar. 29, 2010 (JP) ................ P2010-076114

(51) Int. Cl.
*G21C 9/00* (2006.01)
*G21C 9/016* (2006.01)

(52) U.S. Cl.
CPC *G21C 9/016* (2013.01); *Y02E 30/40* (2013.01)

(58) Field of Classification Search
CPC .... G21C 9/00; G21C 9/016; G21Y 2002/207; G21Y 2002/303; G21Y 2002/501; G21Y 2004/10; G21Y 2004/303
USPC .......................... 376/277, 280, 287, 288, 293
See application file for complete search history.

(56) References Cited

U.S. PATENT DOCUMENTS

| 5,057,271 A | 10/1991 | Turricchia |
| 5,280,509 A | 1/1994 | Py et al. |

(Continued)

FOREIGN PATENT DOCUMENTS

| CN | 1918664 | 2/2007 |
| DE | 43 37 367 A1 | 12/1994 |

(Continued)

OTHER PUBLICATIONS

"Zirconia—ZrO2, Zirconium Dioxide", Ceram Research, http://www.azom.com, retrieved Jul. 16, 2014.*

(Continued)

*Primary Examiner* — Jack W Keith
*Assistant Examiner* — Marshall O'Connor
(74) *Attorney, Agent, or Firm* — Finnegan, Henderson, Farabow, Garrett & Dunner, L.L.P.

(57) ABSTRACT

There is provided a holding device which can hold a molten corium for a predetermined period even when the molten corium is exposed to heat or undergoes any chemical reaction and which is applicable to practical use. There is provided a holding device provided below a nuclear reactor pressure vessel for holding a molten corium, wherein the holding device includes a base material in contact with a cooling medium, and a multilayer stack structure on the base material. The multilayer stack structure has a first layer having heat-resistant property, a second layer formed on the first layer and having heat-resistant property with lower heat conductivity than that of the first layer, and a third layer formed on the second layer and having corrosion-resistant property and impact-absorbing property.

11 Claims, 4 Drawing Sheets

(56) References Cited

U.S. PATENT DOCUMENTS

| | | | | |
|---|---|---|---|---|
| 5,315,625 | A * | 5/1994 | Turricchia | 376/280 |
| 5,343,505 | A | 8/1994 | Serviere | |
| 5,689,538 | A | 11/1997 | Bonhomme | |
| 5,703,917 | A | 12/1997 | Hau et al. | |
| 6,192,097 | B1 * | 2/2001 | Hau et al. | 376/280 |
| 2002/0044622 | A1 * | 4/2002 | Alsmeyer et al. | 376/280 |
| 2009/0080589 | A1 | 3/2009 | Sato et al. | |
| 2009/0116607 | A1 | 5/2009 | Song et al. | |

FOREIGN PATENT DOCUMENTS

| | | |
|---|---|---|
| DE | 43 39 904 A1 | 12/1994 |
| DE | 199 49 583 A1 | 4/2000 |
| DE | 199 49 585 | 4/2000 |
| EP | 0 390 486 | 10/1990 |
| EP | 0 907 187 | 4/1999 |
| FR | 2 763 168 | 11/1998 |
| FR | 2 784 784 | 4/2000 |
| FR | 2 784 785 | 4/2000 |
| GB | 2 342 769 | 4/2000 |
| GB | 2 342 770 | 4/2000 |
| JP | 2-136789 | 5/1990 |
| JP | 2-281190 | 11/1990 |
| JP | 3-87693 | 4/1991 |
| JP | 4-136793 | 5/1992 |
| JP | 5-5795 | 1/1993 |
| JP | 5-72372 | 3/1993 |
| JP | 5-203779 | 8/1993 |
| JP | 5-249273 | 9/1993 |
| JP | 5-341081 | 12/1993 |
| JP | 6-130169 | 5/1994 |
| JP | 6-265675 | 9/1994 |
| JP | 6-300880 | 10/1994 |
| JP | 6-324178 | 11/1994 |
| JP | 7-110392 | 4/1995 |
| JP | 7-128476 | 5/1995 |
| JP | 8-43575 | 2/1996 |
| JP | 8-43576 | 2/1996 |
| JP | 8-271668 | 10/1996 |
| JP | 9-138292 | 5/1997 |
| JP | 9-505406 | 5/1997 |
| JP | 9-211166 | 8/1997 |
| JP | 10-319166 | 12/1998 |
| JP | 2000-121771 | 4/2000 |
| JP | 2000-121772 | 4/2000 |
| JP | 2002-168986 | 6/2002 |
| JP | 2002-530682 | 9/2002 |
| JP | 2005-189043 | 7/2005 |
| JP | 2007-232529 | 9/2007 |
| JP | 2008-139023 | 6/2008 |
| KR | 2000-0029086 | 5/2000 |
| KR | 2000-0029087 | 5/2000 |
| KR | 10-2005-0080667 | 8/2005 |
| WO | WO 94/29877 | 12/1994 |
| WO | WO 95/14997 | 6/1995 |
| WO | WO 00/31746 | 6/2000 |
| WO | WO 2005/076285 A1 | 8/2005 |

OTHER PUBLICATIONS

"Thermal Conductivity of some common Materials and Gases", www.enginneeringtoolbox.com, retrieved Jul. 16, 2014.*

International Preliminary Report on Patentability and Written Opinion issued by the International Bureau of WIPO on Nov. 1, 2012, in International Application No. PCT/JP2011/001470.

International Search Report from Japanese Patent Office for International Application No. PCT/JP2011/001470, mailed Apr. 19, 2011.

* cited by examiner

HOLDING DEVICE

CROSS-REFERENCE TO RELATED APPLICATIONS

This application is a continuation of prior International Application No. PCT/JP2011/001470 filed on Mar. 14, 2011, which is based upon and claims the benefit of priority from Japanese Patent Application No. 2010-076114 filed on Mar. 29, 2010; the entire contents of all of which are incorporated herein by reference.

FIELD

The present invention relates to a molten corium holding device and more particularly to a holding device capable of holding, when a core meltdown accident occurs, a molten corium until a cooling water is inputted thereinto.

BACKGROUND

In a water-cooled nuclear reactor, when a cooling water is supplied no longer into a nuclear reactor pressure vessel because of stop of supply of the cooling water and/or fracture of piping, the reactor water level comes down to expose a reactor core and possibly results in insufficient cooling of the reactor core. Preparing for such a case, a signal indicating the drawdown of water level is used to automatically subject the nuclear reactor to emergency stop, and a cooling material is poured by an emergency core cooling system (ECCS) to cover the reactor core with water and cool it, thereby preventing the core meltdown accident.

However, it takes a certain amount of time to input the cooling material, and it can also be envisioned that, though at a very low probability, the emergency core cooling system does not operate and another device for pouring water to the reactor core is not available. In this case, the water level in the nuclear reactor pressure vessel remains at the lowered level, and sufficient cooling of the exposed reactor core is not performed any longer to increase the temperature of fuel rods by the decay heat continuously generated even after the stop of the nuclear reactor, finally leading to a core meltdown.

When falling into such a situation, the molten corium (corium) at a high temperature melts down to a lower portion of the nuclear reactor pressure vessel, and melts and penetrates the lower portion of the nuclear reactor pressure vessel and finally falls onto the floor inside the containment vessel. The molten corium heats the concrete laid on the containment vessel floor and reacts with the concrete when the contact surface between them becomes a high temperature state to generate a large quantity of a non-condensable gas such as carbon dioxide or hydrogen and melt and corrode the concrete.

The pressure of the generated non-condensable gas can be reduced to some degree by cooling it in a suppression pool, but if the quantity of the generated gas is large, its pressure cannot be sufficiently reduced even in the suppression pool. This can result in an increase in pressure inside the containment vessel to damage the nuclear reactor containment vessel, and the melting and corrosion of the concrete can damage the containment vessel boundary. In short, a reaction occurring between the molten corium and the concrete and continuing for a predetermined period leads to damage of the containment vessel and can release a radioactive material inside the containment vessel to an external environment.

From such a viewpoint, in order to suppress the reaction between the molten corium and the concrete, it is necessary to cool the molten corium to decrease the temperature of the surface of a bottom portion of the molten corium in contact with the concrete to a corrosion temperature or lower (1500 K or lower for a typical concrete), or to prevent the molten corium from coming into direct contact with the concrete. As a representative of the latter means, there is a so-called molten corium holding device (core catcher). The molten corium holding device is a facility which receives the falling molten corium by a heat-resistant material and cools the molten corium in combination with a water pouring systems.

However, a period of about 10 minutes may be required until the cooling water is supplied from the water pouring systems, and it is necessary to hold the molten corium only by the molten corium holding device during this period. Accordingly, the molten corium holding device is required to have a very high heat resistance.

It has conventionally been tried that the molten corium holding device is composed using concrete containing as main components calcium oxide and silicon oxide or the molten corium holding device is composed using tiles made of a high melting point material. However, the temperature of the molten corium holding device rapidly increases from room temperature to 2000° C. when holding the molten corium. Therefore, an optimal molten corium holding device is not provided yet at present because various factors of damage work in combination, such as a problem of damage due to the thermal stress generated at the temperature increase, a problem of the reaction of the molten corium with the heat-resistant material constituting the molten corium holding device, a problem of a so-called jet impingement that the molten corium spouting in a jet form locally collides against the surface of the heat-resistant material to cause melting and corrosion and so on.

DETAILED DESCRIPTION

Figure 1:
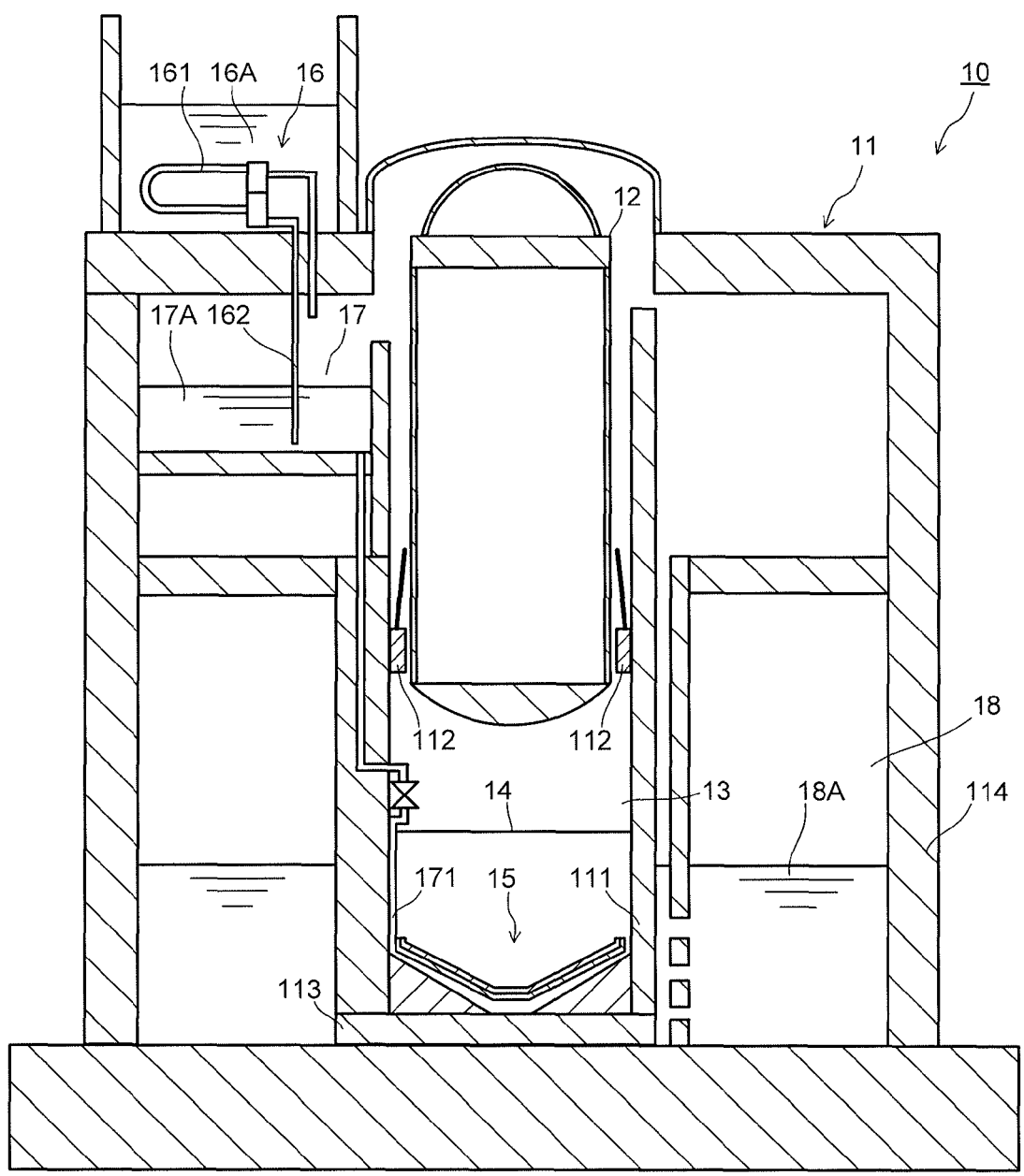
FIG. 1 is a sectional view illustrating a schematic configuration of a water-cooled nuclear reactor in a first embodiment.

In an embodiment, it is described to solve the above problems and also to provide a molten corium holding device which can hold a molten corium for a predetermined period even when the molten corium is exposed to heat or undergoes any chemical reaction and which is applicable to practical use.

An aspect of the embodiments is a holding device provided below a nuclear reactor pressure vessel for holding a molten corium, which includes a base material configured to contact with a cooling medium, and a multilayer stack structure on the base material. The multilayer stack structure has a first layer having heat-resistant property, a second layer formed on the first layer and having heat-resistant property with lower heat conductivity than heat conductivity of the first layer, and a third layer formed on the second layer and having corrosion-resistant property and impact-absorbing property.

It is found that the above problems are solved by configuring the molten corium holding device to have a flow channel for the cooling water formed therein, and include a base material in contact with the cooling water and a multilayer stack structure in which a first heat-resistant layer (a first layer), a second heat resistant layer (a second layer), and a corrosion-resistant impact-absorbing layer (a third layer) formed in order on the base material, thereby arriving at the present invention. Incidentally, it is necessary that the second heat-resistant layer is lower in heat conductivity than the first heat-resistant layer.

The corrosion-resistant impact-absorbing layer is a layer which is located on the uppermost surface of the multilayer stack structure and against which the molten corium falling from the nuclear reactor pressure vessel collides first. Accordingly, the corrosion-resistant impact-absorbing layer can cushion the impact of the molten corium, as its name suggests, and mitigate the corrosion by the molten corium at the initial stage. As a result of this, the conventional jet impingement problem can be solved.

On the other hand, during the time when the molten corium holding device holds the molten corium, the possibility that the molten corium corrodes the corrosion-resistant impact-absorbing layer and reaches the second heat-resistant layer increases. In this case, it is necessary to prevent the heat of the molten corium from being conducted to the first heat-resistant layer and the base material to corrode or melt the first heat-resistant layer and the like during the time when the second heat-resistant layer holds the molten corium. Accordingly, the second heat-resistant layer is required to be low in heat conductivity and, in particular, to have a heat conductivity lower than that of the first heat-resistant layer described below. In other words, the second heat-resistant layer satisfies the requirement and thereby can suppress the heat of the molten corium being conducted to the first heat-resistant layer and the base material.

Further, the second heat-resistant layer is preferably made of a chemically stable material and is excellent in heat resistance, as its name suggests, and therefore can suppress corrosion and wear of the heat-resistant material by the molten corium for a desired period by making the thickness of this layer appropriate.

When the molten corium has reached the second heat-resistant layer, the molten corium corrodes the second heat-resistant layer, so that the thickness of a portion of the second heat-resistant layer holding molten corium decreases. However, the first heat-resistant layer located at the lowermost layer of the multilayer stack structure and in contact with the base material forming the flow channel of the cooling water is high in heat conductivity and therefore can effectively conduct coldness by the cooling water to the molten corium via the base material when the cooling water is supplied to the cooling water flow channel, thereby effectively cooling the molten corium.

On the other hand, it is also conceivable that the molten corium reaches the first heat-resistant layer during or before the above-described cooling. However, the first heat-resistant layer is excellent in heat resistance and therefore can prevent the molten corium from adversely thermally affecting the base material and prevent damage and deformation of the base material. Further, the first heat-resistant layer can be made of a chemically stable material and suppress as much as possible the corrosion by the molten corium and suppress the molten corium reaching the base material and damaging the metal member.

According to embodiments, it is possible to provide a molten corium holding device which can hold a molten corium for a predetermined period even when the molten corium is exposed to heat or undergoes any chemical reaction and which is applicable to practical use.

Hereinafter, details, other characteristics and advantages of the present invention will be described based on embodiments referring to the drawings.

First Embodiment

Figure 2:
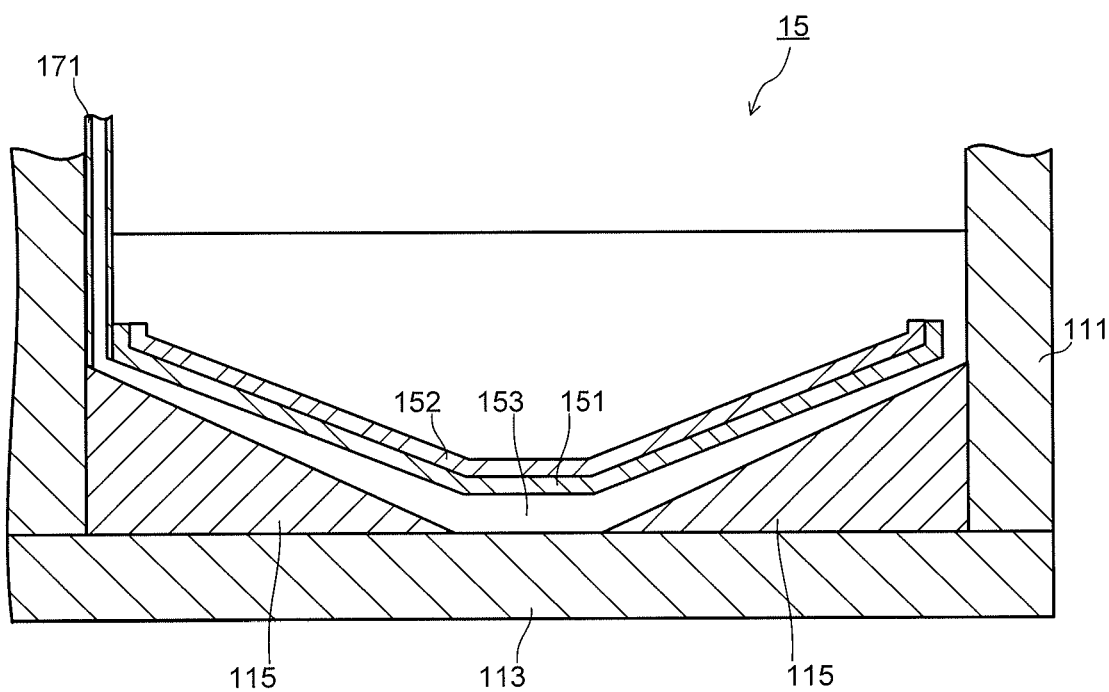
FIG. 2 is a sectional view illustrating an enlarged schematic configuration of a molten corium holding device of the water-cooled nuclear reactor illustrated in FIG. 1.
Figure 3:
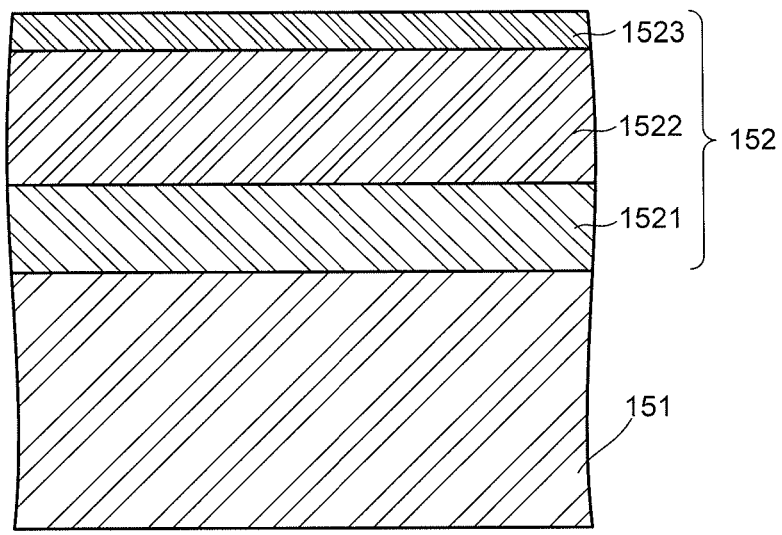
FIG. 3 is a sectional view schematically illustrating a layer configuration of the molten corium holding device illustrated in FIG. 2.

FIG. 1 is a sectional view illustrating a schematic configuration of a water-cooled nuclear reactor in this embodiment, FIG. 2 is a sectional view illustrating an enlarged schematic configuration of a molten corium holding device of the water-cooled nuclear reactor illustrated in FIG. 1. Further, FIG. 3 is a sectional view schematically illustrating a layer configuration of the molten corium holding device illustrated in FIG. 2.

As illustrated in FIG. 1, a water-cooled nuclear reactor 10 in this embodiment includes a containment vessel 11, and a nuclear reactor pressure vessel 12 fixed inside the containment vessel 11 by a pair of members 111 and jigs 112 constituting the containment vessel 11. Note that the nuclear reactor pressure vessel 12 can include, for example, a nuclear reactor vessel of the PWR. A sump floor 14 is provided below the nuclear reactor pressure vessel 12 via a lower dry well 13, and a molten corium holding device 15 is provided below the sump floor 14.

Further, at the upper left portion of the containment vessel 11, a cooling water generator 16 for cooling, by a cooler 161, the water vapor generated, for example, in the nuclear reactor pressure vessel 12 to generate a cooling water as a cooling medium is provided. A generated cooling water 16A is sent from the cooling water generator 16 to a cooling water storage tank 17 provided below the cooling water generator 16 via a pipe 162 and stored as a cooling water 17A. The cooling water 17A is to be supplied to a cooling water channel in the molten corium holding device 15 via a pipe 171. Further, a suppression pool 18 is provided in a manner to be demarcated from an outer wall 114 of the containment vessel 11 by the pair of members 111 and has a cooling water 18A stored therein.

As illustrated in FIG. 2, the molten corium holding device 15 has a metal member 151 as a concave-shaped base material forming a cooling water channel 153 together with a floor member 113 of the containment vessel 11 and jigs 115 in a triangle shape, and a multilayer stack structure 152 formed on the metal member 151.

Further, as illustrated in FIG. 3, the multilayer stack structure 152 is composed of a first heat-resistant layer 1521, a second heat-resistant layer 1522, and a corrosion-resistant impact-absorbing layer 1523 which are formed in order on the metal member 151.

The corrosion-resistant impact-absorbing layer 1523 is a layer which is located on the uppermost surface of the multilayer stack structure 152 and against which a falling molten corium collides first, the molten corium being generated by an emergency core cooling system (ECCS) (not illustrated) or the like not functioning well to cause a core meltdown accident that the fuel rod temperature increases due to decay heat to lead to core meltdown, and then, melting and penetrating a lower portion of the nuclear reactor pressure vessel 12. Accordingly, the corrosion-resistant impact-absorbing layer 1523 is required to cushion the impact of the molten corium, as its name suggests, so as to suppress the corrosion by the molten corium to a certain degree.

The molten corium is made of an oxide expressed by a general formula such as $UO_2$ and $ZrO_2$ and a metal component such as Zr and Fe. However, the molten corium is not limited to the oxide expressed by the general formula but varies in material composition depending on the material composition and the damage status of the fuel rod in use.

The corrosion-resistant impact-absorbing layer 1523 is not particularly limited in material composition and form as long as it provides the above-described operation and effect, but can be, for example, a fibrous ceramic layer (first aspect). Such a fibrous ceramic layer is rich in elasticity and therefore can cushion the impact of the falling molten corium as described above on the multilayer stack structure 152. Further, owing to the material composition being ceramic, the corrosion resistance is also excellent.

Further, the corrosion-resistant impact-absorbing layer 1523 can also be a dense ceramic layer having a porosity of 5% or less (second aspect). In this case, the corrosion-resistant impact-absorbing layer 1523 can be increased in strength and thereby cushion the impact of the falling molten corium as described above on the multilayer stack structure 152. Further, owing to the material composition being ceramic, the corrosion resistance is also excellent. Note that the lower limit of the porosity is not particularly limited, but the porosity can be decreased at present down to about 1% by controlling the molding condition and the firing condition of the ceramic raw material.

Comparing the above two aspects, the fibrous ceramic layer is superior in impact-absorbing property to the dense ceramic layer having a porosity of 5% or less but is inferior in corrosion resistance because the molten corium permeates gaps.

Therefore, the above-described two aspects can be combined together. More specifically, the corrosion-resistant impact-absorbing layer 1523 can also be composed of two layers in which one of the layers is a fibrous ceramic layer and the other layer is a dense ceramic layer having a porosity of 5% or less.

Note that since the fibrous ceramic layer is superior in impact-absorbing property but is inferior in corrosion resistance to the dense ceramic layer having a porosity of 5% or less as described above, the above-described operation and effect can be further enhanced by arranging the fibrous ceramic layer as the upper layer and the dense ceramic layer as the lower layer (third aspect).

In any aspect, the corrosion-resistant impact-absorbing layer 1523 exhibits the impact-absorbing property and the corrosion resistance, as its name suggests, and can suppress the jet impingement caused when the molten corium locally falls on the molten corium holding device 15.

Note that it is preferable that the ceramic constituting the corrosion-resistant impact-absorbing layer 1523 is the one which does not react with the molten corium having the above-described general formula. Table 1 presents the result of investigation of the reactivity between various ceramics and the molten corium. In table 1, "B" and "A" indicate a low reactivity with the molten corium and x indicates a high reactivity with the molten corium. "C" indicates a certain degree of reactivity with the molten corium.

TABLE 1

| | Melting point | Reactivity |
|---|---|---|
| $Al_2O_3$ | 2323 | A |
| CaO | 2873 | X |
| MgO | 3073 | X |
| $SiO_2$ | 1883 | C |
| $TiO_2$ | 2113 | B |

TABLE 1-continued

| | Melting point | Reactivity |
|---|---|---|
| $ZrO_2$ | 2950 | A |
| $HfO_2$ | 3085 | A |
| $Y_2O_3$ | 2673 | B |
| $Nd_2O_3$ | 2173 | B |
| $LaPO_4$ | 2250 | C |

As is clear from Table 1, aluminum oxide, titanium oxide, zirconium oxide, hafnium oxide and the like are low in reactivity with the molten corium and also superior in strength, and therefore preferable as the ceramic constituting the corrosion-resistant impact-absorbing layer 1523. In other words, aluminum oxide, titanium oxide, zirconium oxide, hafnium oxide and the like can be preferably used as the ceramic of the corrosion-resistant impact-absorbing layer 1523.

Note that the thickness of the corrosion-resistant impact-absorbing layer 1523 is not particularly limited, but can be set, for example, to 5 mm to 500 mm. Further, the fibrous ceramic layers made of the above-described preferable ceramic materials are commercially available and include, for example, Zirconia Felt Type ZYF manufactured by Zircar Zirconia Inc. and the like.

On the other hand, during the time when the molten corium holding device 15 holds the molten corium, the possibility that the molten corium corrodes the corrosion-resistant impact-absorbing layer 1523 and reaches the second heat-resistant layer 1522 increases. In this case, it is necessary to prevent the heat of the molten corium from being conducted to the first heat-resistant layer 1521 and the metal member 151 to corrode or melt the first heat-resistant layer 1521 and the like during the time when the second heat-resistant layer 1522 holds the molten corium. Accordingly, the second heat-resistant layer 1522 is required to be low in heat conductivity and, in particular, to have a heat conductivity lower than that of the first heat-resistant layer 1521 described below. In other words, the second heat-resistant layer 1522 satisfies the requirement and thereby can suppress the heat of the molten corium being conducted to the first heat-resistant layer 1521 and the metal member 151.

Further, it is important that the second heat-resistant layer 1522 is made of a chemically stable material and suppresses the reaction with the molten corium to suppress the corrosion also when holding the molten corium. In this case, because the molten corium does not directly collide against the second heat-resistant layer 1522, the second heat-resistant layer 1522 is not required to have a strength as high as that of the corrosion-resistant impact-absorbing layer 1523. Accordingly, aluminum oxide, silicon oxide, titanium oxide, zirconium oxide (zirconia), hafnium oxide, yttrium oxide (yttria), neodymium oxide, lanthanum phosphate and the like which are low in reactivity with the molten corium can be used as presented in Table 1. In other words, aluminum oxide, silicon oxide, titanium oxide, zirconium oxide, hafnium oxide, yttrium oxide, neodymium oxide, phosphate compound or the like can be used as the second heat-resistant layer 1522.

Note that forsterite ($2MgO.SiO_2$), alumina cement ($CaO.Al_2O_3$) or the like can be used as the ceramic constituting the second heat-resistant layer 1522 though not particularly presented in Table 1.

Further, as described below, the first heat-resistant layer 1521 can also be made of the same ceramic as that of the second heat-resistant layer 1522. Accordingly, the low heat conductivity of the second heat-resistant layer 1522, in particular, the heat conductivity lower than a first heat conductivity can be achieved by making the porosity of the second heat-resistant layer 1522 higher than the porosity of the first heat-resistant layer 1521. The porosity is set, for example, to 10 mass % to 60 mass %.

In this event, it is possible to make the porosity of the second heat-resistant layer 1522 increase as it goes from the first heat-resistant layer 1521 to the corrosion-resistant impact-absorbing layer 1523. In the case where the porosity of the second heat-resistant layer 1522 is high and the viscosity of the molten corium is low, the molten corium may invade the second heat-resistant layer 1522 via pores and reach the first heat-resistant layer 1521. In this case, by giving a gradient to the porosity in the stack direction of the multilayer stack structure 152 as described above, the molten corium is held at a deep portion of the second heat-resistant layer 1522 where the porosity is decreased to avoid further invasion, thereby preventing a disadvantage that the molten corium reaches the first heat-resistant layer 1521.

Note that the above-described change in porosity can be made continuous or stepwise.

Further, the above-described change in porosity can be attained by molding and firing, when forming the second heat-resistant layer 1522, using a ceramic material with a relatively small particle diameter on the first heat-resistant layer 1521 side and using a ceramic material with a relatively large particle diameter on the corrosion-resistant impact-absorbing layer 1523 side.

The thickness of the second heat-resistant layer 1522 is not particularly limited, but can be set, for example, to 10 mm to 10000 mm.

When the molten corium has reached the second heat-resistant layer 1522, the molten corium corrodes the second heat-resistant layer 1522, so that the thickness of a portion of the second heat-resistant layer 1522 holding the molten corium decreases. Therefore, the first heat-resistant layer 1521 in contact with the metal member 151 located at the lowermost layer of the multilayer stack structure 152 and forming the cooling water channel 153 is made of a predetermined ceramic so as to have a heat conductivity higher than the heat conductivity of the second heat-resistant layer 1522. In this case, the coldness by the cooling water can be effectively conducted to the molten corium via the metal member 151, thereby effectively cooling the molten corium.

On the other hand, it is also conceivable that the molten corium reaches the first heat-resistant layer 1521 during or before the above-described cooling. However, the first heat-resistant layer 1521 is made of the ceramic and excellent in heat resistance as described above and therefore can prevent the molten corium from adversely thermally affecting the metal member 151 and preventing damage and deformation of the metal member 151.

Further, the first heat-resistant layer 1521 can be made of ceramic that is chemically stable as with the second heat-resistant layer 1522. Accordingly, it is possible to suppress as much as possible the corrosion by the molten corium and suppress the molten corium reaching the metal member 151 and damaging the metal member 151.

As the ceramic constituting the first heat-resistant layer 1521, aluminum oxide, silicon oxide, titanium oxide, zirconium oxide (zirconia), hafnium oxide, yttrium oxide (yttria), neodymium oxide, lanthanum phosphate and the like can be used referring to Table 1 similarly to the second heat-resistant layer 1522. In other words, aluminum oxide, silicon oxide, titanium oxide, zirconium oxide, hafnium oxide, yttrium oxide, neodymium oxide, phosphate compound or the like can be used. Further, mullite ($3Al_2O_3 \cdot 2SiO_2$), zircon ($ZrO_2 \cdot SiO_2$) or the like can be used as the ceramic constituting the first heat-resistant layer 1521.

The thickness of the first heat-resistant layer 1521 is not particularly limited, but can be set, for example, to 10 mm to 10000 mm.

The configuration as described above makes it possible for the molten corium holding device 15 in this embodiment to hold the molten corium for a predetermined time even when the molten corium is exposed to heat or undergoes any chemical reaction and to supply it as a practical molten corium.

Second Embodiment

Figure 4:
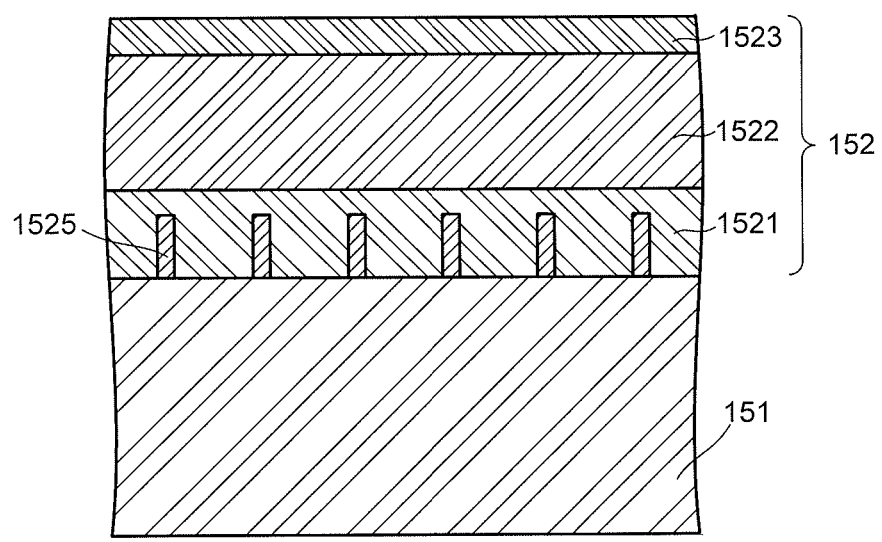
FIG. 4 is a sectional view illustrating a schematic configuration of a layer configuration of a molten corium holding device in a second embodiment.

FIG. 4 is a sectional view illustrating a schematic configuration of a layer configuration of a molten corium holding device in this embodiment. Note that the schematic configuration of a water-cooled nuclear reactor and the schematic configuration of a molten corium holding device are the same as the configurations illustrated in FIG. 1 and FIG. 2 in the first embodiment. Accordingly, the layer configuration of the molten corium holding device different from that in the first embodiment will be described in this embodiment.

As illustrated in FIG. 4, rod-shaped metal members 1525 as high thermal conductive members fastened to a metal member 151 as a base material are embedded in a first heat-resistant layer 1521 to extend along the stack direction of a multilayer stack structure 152 in this embodiment.

The first heat-resistant layer 1521 is required to be high in heat conductivity and effectively conduct coldness by the cooling water supplied to the cooling water flow channel 153 to the molten corium via the metal member 151 as described above. However, the above-described ceramic has a relatively high heat conductivity, whereas zirconium oxide (zirconia) or the like has a relatively low heat conductivity and cannot sufficiently provide the above-described operation and effect in some cases.

However, since the rod-shaped metal members 1525 are embedded in the first heat-resistant layer 1521 in this embodiment, the heat conductivity of the first heat-resistant layer 1521 can be improved. Accordingly, in the case of using a ceramic having a relatively low heat conductivity such as zirconium oxide and also in the case of using other ceramics, the above-described conduction of the coldness can be promoted and the cooling of the molten corium can be more effectively and efficiently performed.

The metal members 1525 can be made of a metal with a high melting point such as tungsten. On the other hand, embedding the metal members 1525 can be performed by a method of forming holes in the first heat-resistant layer 1521, placing the metal members 1525 in the holes, and filling the periphery of the holes with a ramming material being a heat-resistant material, and also by processing the holes into a female screw shape, processing the metal members 1525 into a male screw shape, and screwing them together.

Note that when placing and embedding the metal members 1525 in the holes, it is preferable to set a hole diameter $D_h$ in consideration of the thermal expansion of the metal members 1525, where the diameter of the metal rod is $D_r$, the room temperature is $T_1°$ C., the estimation temperature at high temperature is $T_2°$ C., and the thermal expansion coefficient of the metal rod is $\alpha°$ C.$^{-1}$, $$D_h > D_r \{1 + \alpha(T_2 - T_1)\} \qquad \text{Mathematical Expression 1}$$

Further, the other configuration and form are the same as those in the first embodiment, and therefore the molten corium holding device 15 in this embodiment can hold the molten corium for a predetermined period even when the molten corium is exposed to heat or undergoes any chemical reaction and can supply it as a practical molten corium.

Third Embodiment

Figure 5:
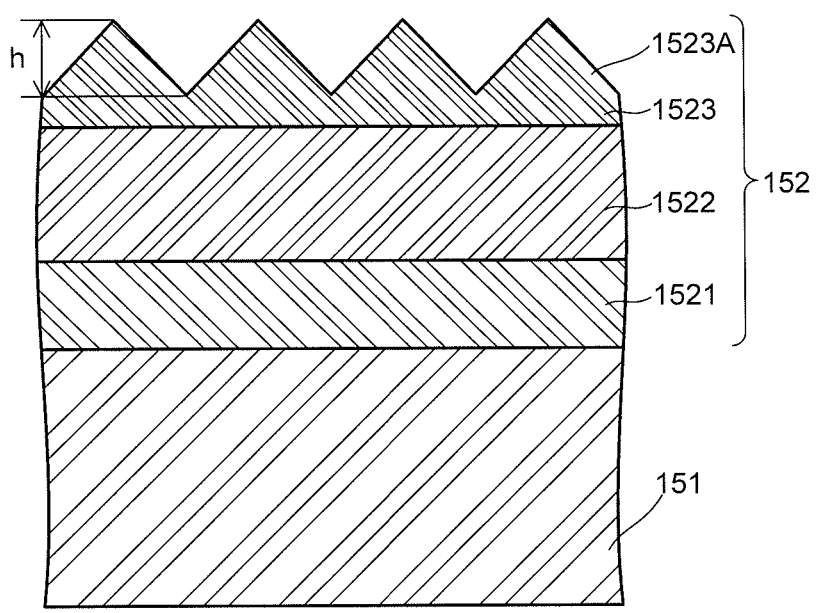
FIG. 5 is a sectional view illustrating a schematic configuration of a layer configuration of a molten corium holding device in a third embodiment.

FIG. 5 is a sectional view illustrating a schematic configuration of a layer configuration of a molten corium holding device in this embodiment. Note that the schematic configuration of a water-cooled nuclear reactor and the schematic configuration of a molten corium holding device are the same as the configurations illustrated in FIG. 1 and FIG. 2 in the first embodiment. Accordingly, the layer configuration of the molten corium holding device different from that in the first embodiment will be described in this embodiment.

As illustrated in FIG. 5, a rugged part 1523A with a height difference h of 1 cm or more, preferably, 5 cm or more on the surface of a corrosion-resistant impact-absorbing layer 1523 in this embodiment. In this case, when the molten corium collides against a multilayer stack structure 152 of a molten corium holding device 15, namely, the corrosion-resistant impact-absorbing layer 1523, the molten corium can be made to scatter. Accordingly, the impact due to the collision of the molten corium can effectively cushioned.

Note that from this viewpoint, this embodiment also corresponds to a fourth aspect of the corrosion-resistant impact-absorbing layer 1523 described in the first embodiment.

Further, the other configuration and form are the same as those in the first embodiment, and therefore the molten corium holding device 15 in this embodiment can hold the molten corium for a predetermined period even when the molten corium is exposed to heat or undergoes any chemical reaction and supply it as a practical molten corium.

Fourth Embodiment

In this embodiment, though not particularly illustrated, a first heat-resistant layer 1521, a second heat-resistant layer 1522, and a corrosion-resistant impact-absorbing layer 1523 can be made in a structure in which heat-resistant materials in a block shape such as heat-resistant materials made of the above-described ceramic are piled up. This makes it possible to relax the thermal stress generated between adjacent layers based on the difference in the degree of thermal expansion generated in the layers during the time when the molten corium is held, and suppress possibility of crack and damage in the layers to suppress breakage of the layers.

A conceivable sectional shape of the block is a so-called Penrose tiling composed of tiles of triangle, quadrangle, hexagon, or two kinds of rhombic. However, quadrangle or hexagon is considered to be preferable for reduction in thermal stress at corners and easy fabrication of the tiles.

Further, conceivable methods of holding tiles include a method of combining them by forming fitting portions in the tiles, a method of forming holes into which anchor pins are inserted on the tile side and fastening them with pins, a method of using a joint filler in gaps between the tiles, and a method of combining those methods, and it is preferable to fix the tiles using a joint filler to a certain degree in consideration of the easiness of implementation.

Conceivable materials of the joint filler include the one containing, as a main component, aluminum oxide, zirconium oxide, magnesium oxide, and silicon oxide. Further, the joint filler can be made in accordance with the kind of the ceramic constituting the tiles and, for example, it can be devised that when the first heat-resistant layer 1521 is made of dense aluminum oxide, an aluminum oxide-based joint filler which is excellent with the dense aluminum oxide and has a high heat resistance is used, whereas when the second heat-resistant layer 1522 is made of zirconium oxide, a zirconium oxide-based joint filler which is excellent with the zirconium oxide and has a low heat conductivity is used, and a magnesium oxide-based joint filler which is highly resistant to the jet impingement is used on the uppermost surface.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A holding device provided below a nuclear reactor pressure vessel for holding a molten corium, comprising:
    a base material configured to contact with a cooling medium;
    a first layer made of ceramic material formed on the base material, the first layer having heat-resistant property;
    a second layer made of ceramic material formed on the first layer, the second layer having higher porosity than porosity of the first layer so as to have lower heat conductivity than heat conductivity of the first layer, the second layer having porosity from 10 mass % to 60 mass %; and
    a third layer formed on the second layer, the third layer having corrosion-resistant property and impact-absorbing property.

2. The holding device according to claim 1,
    wherein the first layer comprises at least one of heat-resistant material selected from a group consisting of aluminum oxide, silicon oxide, titanium oxide, zirconium oxide, hafnium oxide, yttrium oxide, neodymium oxide, and phosphate compound.

3. The holding device according to claim 1, further comprising a high thermal conductive member embedded in the first layer, the high thermal conductive member being fastened to the base material.

4. The holding device according to claim 1,
    wherein the second layer comprises at least one of aluminum oxide, silicon oxide, titanium oxide, zirconium oxide, hafnium oxide, yttrium oxide, neodymium oxide, and phosphate compound.

5. The holding device according to claim 1,
    wherein the porosity of the second layer increases from the first layer side to the third layer side.

6. The holding device according to claim 1,
    wherein the third layer is made of a fibrous layer comprising at least one selected from a group consisting of aluminum oxide, titanium oxide, zirconium oxide, and hafnium oxide.

7. The holding device according to claim 1,
    wherein the third layer is made of at least one selected from a group consisting of aluminum oxide, titanium oxide, zirconium oxide, and hafnium oxide, the third layer having porosity of 5% or less.

8. The holding device according to claim 1,
    wherein the third layer comprises
    a fourth layer made of a fibrous layer, and
    a fifth layer disposed on the second layer, the fifth layer having porosity of 5% or less,
    the fourth layer being disposed on the fifth layer.

9. The holding device according to claim 1,
    wherein the third layer has a rugged part with a height difference of 1 cm or more on a surface thereof.

10. The holding device according to claim 1,
wherein the first layer, the second layer, and the third layer each have a block shape.

11. The holding device according to claim 10, further comprising:
a joint filler between the first layer, the second layer, and the third layer, the joint filler comprising at least one selected from a group consisting of aluminum oxide, zirconium oxide, magnesium oxide, and silicon oxide.

* * * * *